(12) United States Patent
Sakurai et al.

(10) Patent No.: US 7,623,311 B2
(45) Date of Patent: Nov. 24, 2009

(54) RECORDING MEDIA, RECORDING AND REPRODUCING APPARATUS, AND METHOD FOR RECORDING AND REPRODUCING

(75) Inventors: Masatoshi Sakurai, Tokyo (JP); Takeshi Okino, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 626 days.

(21) Appl. No.: 11/375,584

(22) Filed: Mar. 15, 2006

(65) Prior Publication Data

US 2006/0215295 A1     Sep. 28, 2006

(30) Foreign Application Priority Data

Mar. 18, 2005    (JP) .............................. 2005-079581

(51) Int. Cl.
*G11B 5/09* (2006.01)
(52) U.S. Cl. .......................................... 360/48; 360/53
(58) Field of Classification Search .................. None
See application file for complete search history.

(56) References Cited

U.S. PATENT DOCUMENTS

| | | | |
|---|---|---|---|
| 3,286,251 A | 11/1966 | Rendlet et al. | |
| 5,274,510 A | 12/1993 | Sugita et al. | |
| 5,466,904 A | 11/1995 | Pfeiffer et al. | |
| 5,545,902 A | 8/1996 | Pfeiffer et al. | |
| 5,587,850 A | 12/1996 | Ton-that | |
| 5,600,506 A | 2/1997 | Baum et al. | |
| 5,828,536 A | 10/1998 | Morita | |
| 5,875,083 A | 2/1999 | Oniki et al. | |
| 6,313,969 B1 * | 11/2001 | Hattori et al. | 360/135 |
| 6,377,413 B1 * | 4/2002 | Sacks et al. | 360/48 |
| 6,424,479 B1 | 7/2002 | Hayashi | |
| 6,433,950 B1 | 8/2002 | Liikanen | |
| 6,529,341 B1 | 3/2003 | Ishida et al. | |
| 6,563,673 B2 | 5/2003 | Mundt et al. | |
| 6,667,849 B2 | 12/2003 | Sasaki et al. | |
| 6,748,865 B2 | 6/2004 | Sakurai et al. | |
| 6,805,966 B1 | 10/2004 | Formato et al. | |
| 6,877,343 B2 | 4/2005 | Watanabe et al. | |
| 6,887,626 B2 | 5/2005 | Koba | |
| 6,961,203 B1 | 11/2005 | Baker | |
| 6,967,798 B2 | 11/2005 | Homola et al. | |
| 6,980,387 B2 * | 12/2005 | Yoshizawa et al. | 360/69 |
| 7,031,086 B2 | 4/2006 | Nishida et al. | |

(Continued)

FOREIGN PATENT DOCUMENTS

JP             3-116506            5/1991

(Continued)

OTHER PUBLICATIONS

Office Action mailed Feb. 26, 2008 in Japanese Patent Application No. 2005-079581 with English translation.

(Continued)

*Primary Examiner*—Jason C Olson
(74) *Attorney, Agent, or Firm*—Nixon & Vanderhye, PC

(57) ABSTRACT

A magnetic recording layer is formed on a surface of a substrate in magnetic recording media to define magnetic recording regions. Magnetic missing portions are provided in the magnetic recording regions, information cannot be magnetically recorded in the magnetic missing portions. The present invention provides magnetic recording media that enables authentication.

14 Claims, 7 Drawing Sheets

U.S. PATENT DOCUMENTS

| | | |
|---|---|---|
| 7,035,036 B2 | 4/2006 | Shimomura et al. |
| 7,147,790 B2 | 12/2006 | Wachenschwanz et al. |
| 7,150,844 B2 | 12/2006 | Deeman et al. |
| 7,203,969 B2 * | 4/2007 | Sakurai et al. ............... 726/34 |
| 7,214,624 B2 | 5/2007 | Fujita et al. |
| 7,319,568 B2 | 1/2008 | Okino et al. |
| 7,362,528 B2 | 4/2008 | Moriya et al. |
| 2002/0098423 A1 | 7/2002 | Koba |
| 2002/0168548 A1 | 11/2002 | Sakurai et al. |
| 2003/0063403 A1 | 4/2003 | Nishikawa et al. |
| 2004/0100711 A1 * | 5/2004 | Sato et al. .................... 360/48 |
| 2004/0101713 A1 | 5/2004 | Wachenschwanz et al. |
| 2005/0079283 A1 | 4/2005 | Sakurai et al. |
| 2005/0117253 A1 | 6/2005 | Moriya et al. |
| 2005/0175905 A1 | 8/2005 | Amemiya |
| 2005/0219730 A1 | 10/2005 | Sakurai et al. |
| 2006/0012905 A1 | 1/2006 | Okino et al. |
| 2006/0076509 A1 | 4/2006 | Okino et al. |
| 2006/0172155 A1 | 8/2006 | Okino et al. |
| 2006/0222967 A1 | 10/2006 | Okino et al. |
| 2006/0280974 A1 | 12/2006 | Okino et al. |

FOREIGN PATENT DOCUMENTS

| | | |
|---|---|---|
| JP | 04-291256 | 10/1992 |
| JP | 07-201726 | 8/1995 |
| JP | 09-097482 | 4/1997 |
| JP | 09-204747 | 8/1997 |
| JP | 2000-020945 | 1/2000 |
| JP | 2000-339670 | 12/2000 |
| JP | 2001-143257 | 5/2001 |
| JP | 2001-312819 | 11/2001 |
| JP | 2002-008965 | 1/2002 |
| JP | 2002-15420 | 1/2002 |
| JP | 2002-50565 | 2/2002 |
| JP | 2002-222750 | 8/2002 |
| JP | 2002-280290 | 9/2002 |
| JP | 2002-334414 | 11/2002 |
| JP | 2002-342986 | 11/2002 |
| JP | 2002-343710 | 11/2002 |
| JP | 2003-141715 | 5/2003 |
| JP | 2003-142371 | 5/2003 |
| JP | 2003-151209 | 5/2003 |
| JP | 2003-157507 | 5/2003 |
| JP | 2003-157520 | 5/2003 |
| JP | 2003-263850 | 9/2003 |
| JP | 2003-281841 | 10/2003 |
| JP | 2004-39006 | 2/2004 |
| JP | 2004-110896 | 4/2004 |
| JP | 2004-158579 | 6/2004 |
| JP | 2004-179411 | 6/2004 |
| JP | 2004-265486 | 9/2004 |
| JP | 2004-311839 | 11/2004 |
| JP | 2005-166141 | 6/2005 |
| JP | 2005-293730 | 10/2005 |
| JP | 2006-031851 | 2/2006 |

OTHER PUBLICATIONS

Berger et al., *New approach to projection-electron lithography with demonstarted 0.1μm linewidth*, Appl. Phys. Lett. 57(2), Jul. 9, 1990, pp. 153-155.

* cited by examiner

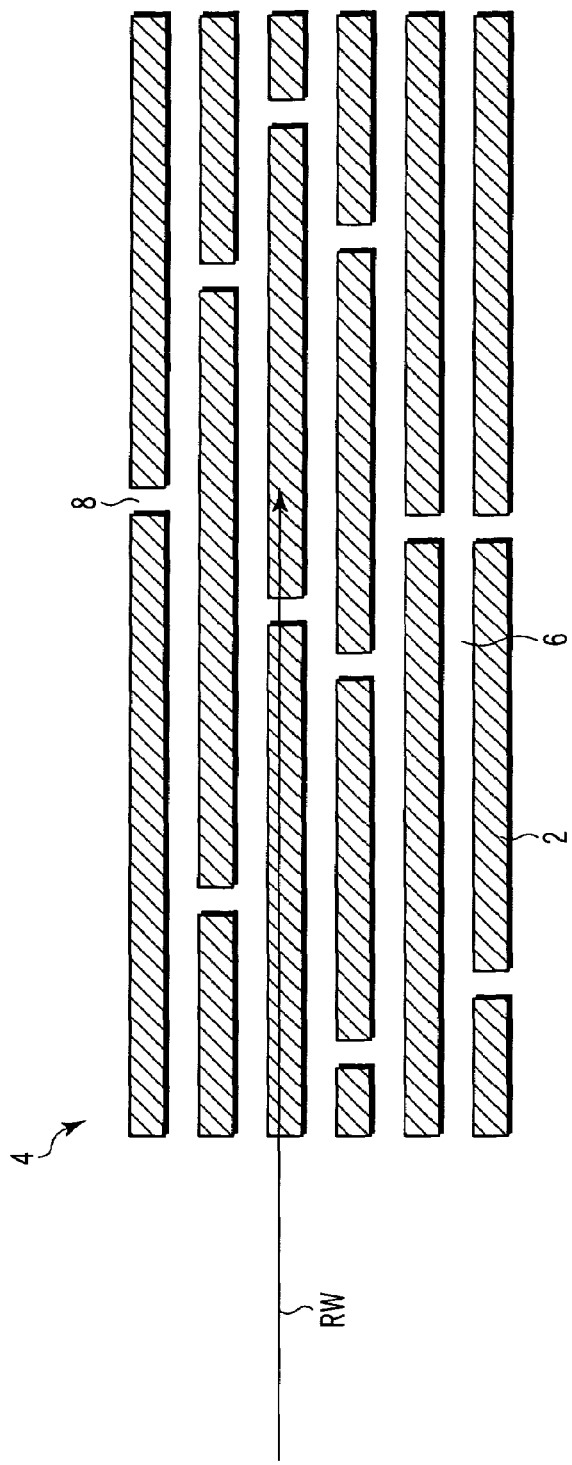
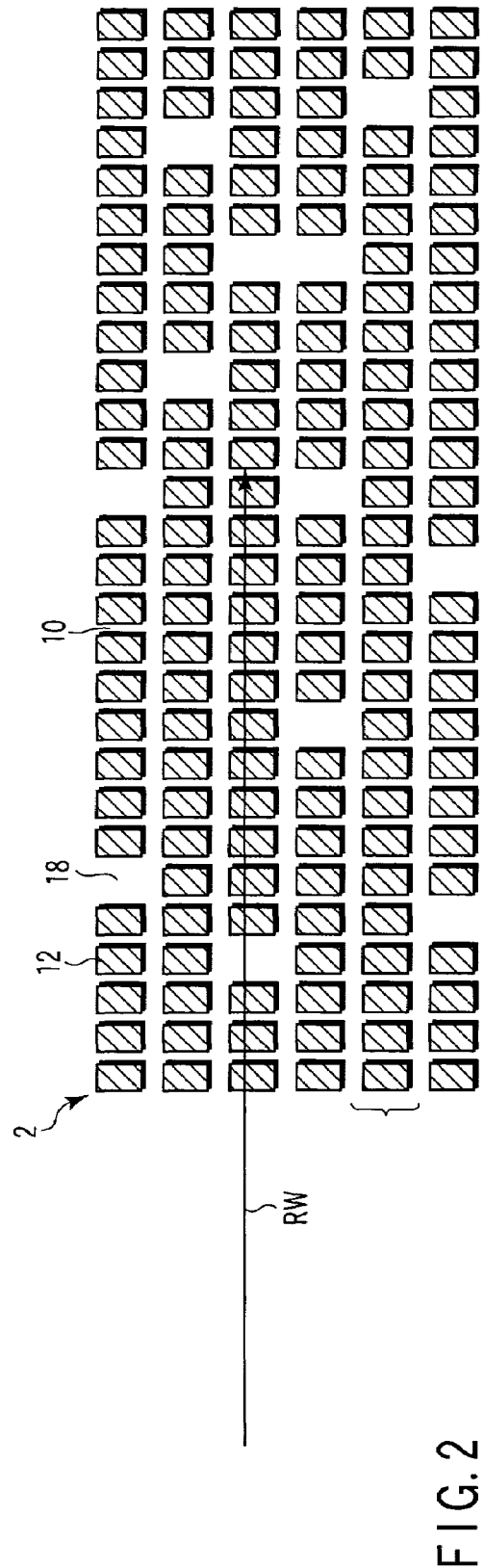
FIG. 1
FIG. 2

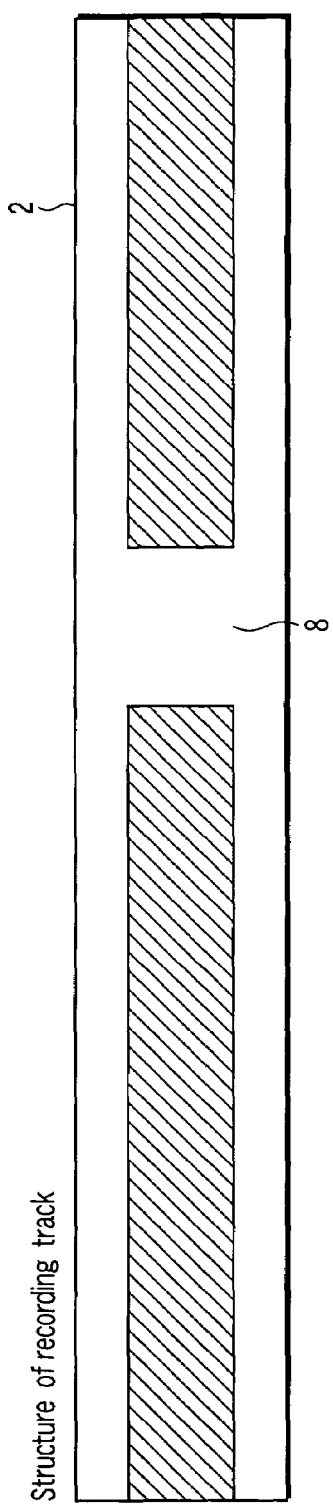
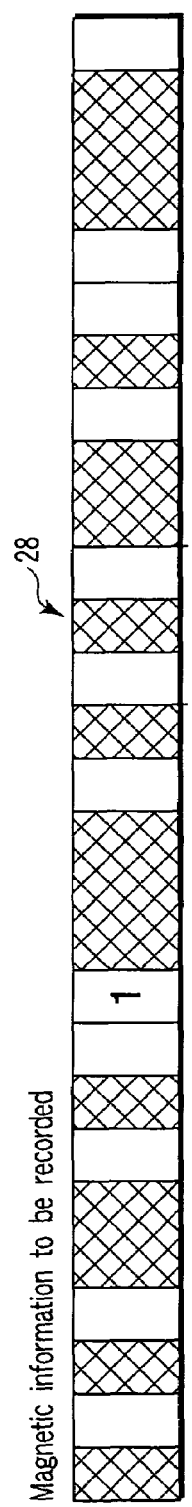
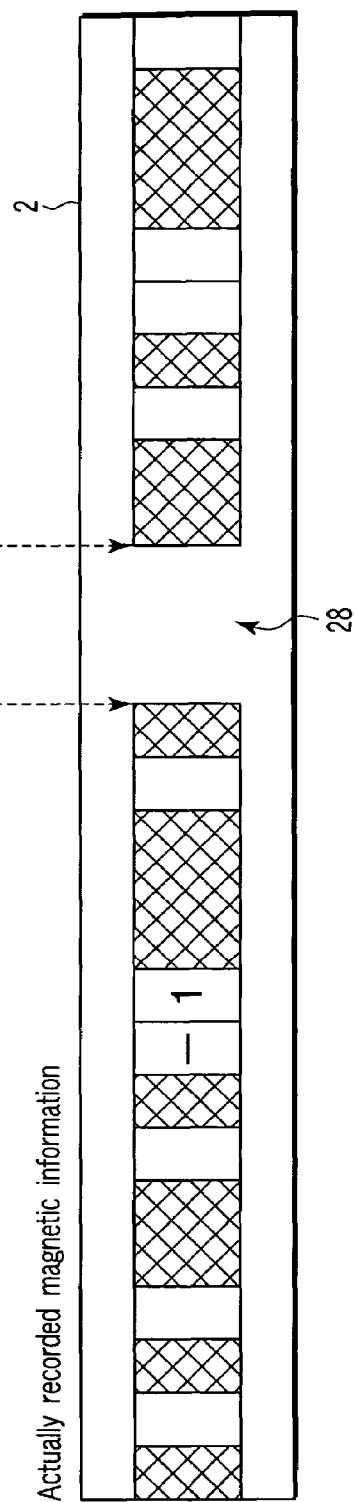
FIG. 5A Structure of recording track
FIG. 5B Magnetic information to be recorded
FIG. 5C Actually recorded magnetic information

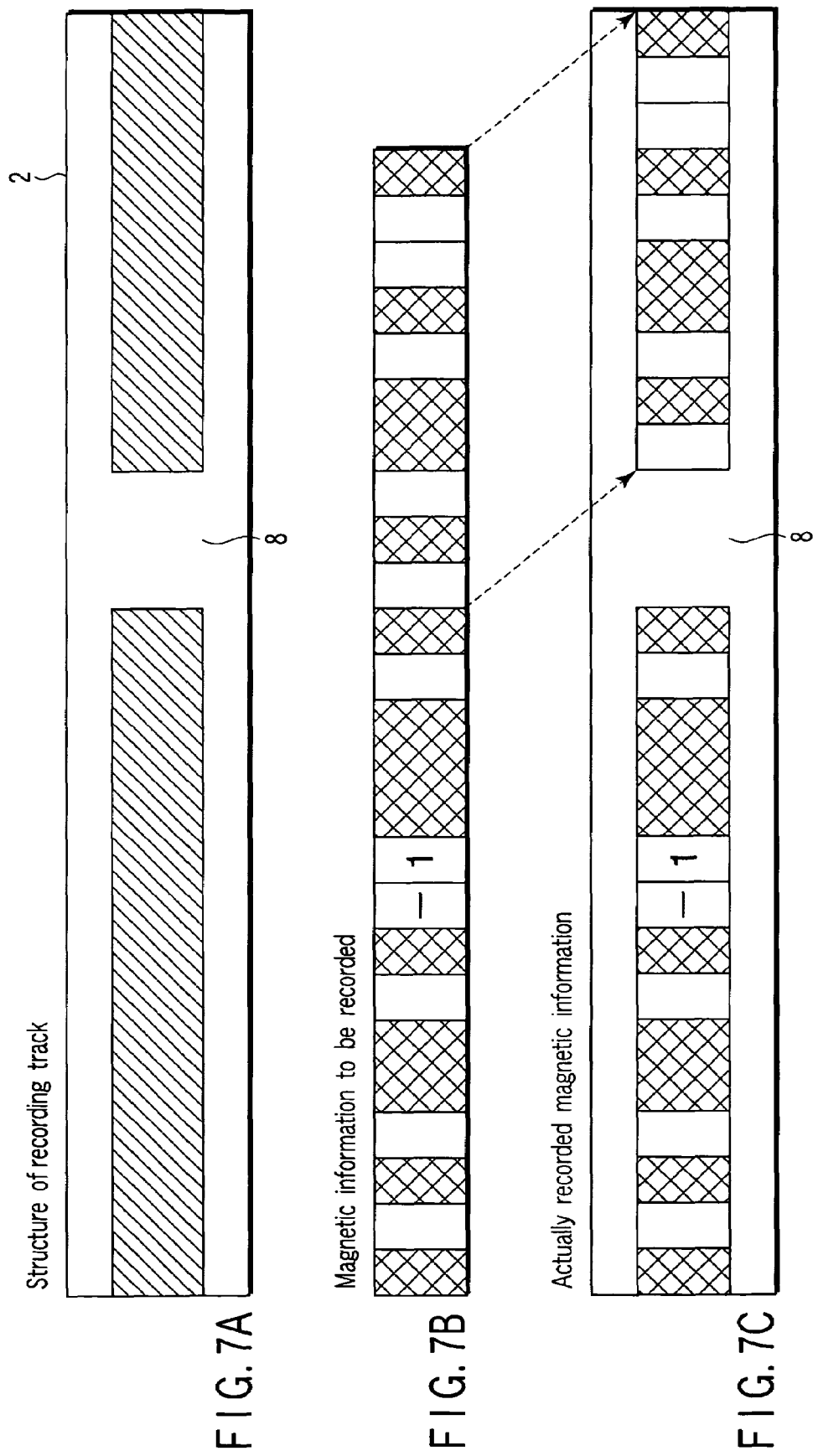

RECORDING MEDIA, RECORDING AND REPRODUCING APPARATUS, AND METHOD FOR RECORDING AND REPRODUCING

CROSS-REFERENCE TO RELATED APPLICATIONS

This application is based upon and claims the benefit of priority from prior Japanese Patent Application No. 2005-079581, filed Mar. 18, 2005, the entire contents of which are incorporated herein by reference.

BACKGROUND OF THE INVENTION

1. Field of the Invention

The present invention relates to recording media, a recording and reproducing apparatus, and a method for recording and reproduction, and in particular, to recording media that, for example, makes it possible to protect contents stored in the recording media from copying, to enable or disable accesses to the contents, or to perform other managing operations, a method for authentication using the recording media, and an authenticating system that can execute the method for authentication.

2. Description of the Related Art

The prevalence of digital data has been increasing the importance of a copy protection technique used to protect the copy rights of video software, application software, and the like. Typical examples of software which require copy protection include DVDs (Digital Versatile Disk) or DVD-ROMs which employ a digital recording system. An enciphering technique is conventionally used for the copy protection of video software for digital recording.

The copy protection method using the enciphering technique has already been effectively functioning for DVDs or DVD-ROMs on which enciphered data is recorded. However, the problems described below may occur in DVD-RAMs on which users can newly record data.

(1) It is difficult to manage a "private key" required for enciphering.

(2) It is difficult to execute an effective enciphering process with data recording and reproducing apparatuses easily available to users, for example, DVD-RAM recorders or the like which enable digital recording and reproduction in the same manner that widespread analog video cassette recorders enable recording and reproduction. With these apparatuses, the cipher is likely to be attacked.

(3) If the data recording and reproducing apparatus can execute an enciphering and deciphering processes, data contents to be protected from copying are easily copied by deciphering data created and enciphered by a user, using another data recording and reproducing apparatus, and then executing an enciphering process again.

These problems make it difficult to allow copy protection using a conventional enciphering technique to function effectively for recording and reproducing apparatuses for digital video data. Further, when a DVD-RAM drive uses its own method to execute a copy protection process on DVD-RAM data recording media, if a DVD-ROM drive reproduces data from the data recording media or conversely the DVD-RAM drive reproduces data from a DVD-ROM disk, a copy protection processing circuit must disadvantageously be complicated. This also increases product costs for the DVD-RAM drive.

The inventor has proposed, in Jpn. Pat. Appln. KOKAI Publication No. 2004-39006, recording media that enable copy protection for recorded data to be realized by providing the media with an authentication region in which RAM bits and ROM bits are arranged; the data in the RAM bits can be rewritten under a first write condition, and data cannot be written to the ROM bits under the first write condition.

On the other hand, in recent years, much attention has been paid to discrete track media in which adjacent magnetic recording tracks are separated from one another by grooves or guard bands consisting of a nonmagnetic material to reduce the magnetic interference among the adjacent tracks; the objective of using the discrete track media is to deal with the further increased density of magnetic recording media. To manufacture such discrete track media, an imprinting method is executed to form patterns of a magnetic substance and a nonmagnetic substance using a stamper; the magnetic substance constitutes magnetic recording tracks.

The recording media disclosed in Jpn. Pat. Appln. KOKAI Publication No. 2004-39006 enables reliable copy protection to be realized. However, it has been desirable to achieve copy protection using a simpler method.

BRIEF SUMMARY OF THE INVENTION

According to an aspect of the present invention, there is provided magnetic recording media comprising:

a substrate;

recording tracks extended on a surface of the substrate so as to lie adjacent to one another;

magnetic recording regions formed in each of the recording tracks and having a magnetic recording layer which enables information to be magnetically recorded; and magnetic missing portions formed in each of the recording tracks so as to separate the magnetic recording regions from one another, no information being magnetically recorded in the magnetic missing portions.

Further, according to an another aspect of the present invention, there is provided magnetic recording media comprising:

a substrate;

recording tracks extended on a surface of the substrate so as to lie adjacent to one another;

magnetic recording dots periodically formed in each of the recording tracks and made of a magnetic recording layer which enables information to be magnetically recorded; and magnetic missing portions which are formed in each of the recording tracks so as to separate the periodic sequence of the magnetic recording dots into pieces, no information being magnetically recorded in the magnetic missing portions.

Moreover, according to an yet another aspect of the present invention, there is provided a recording and reproducing apparatus comprising:

magnetic recording media comprising recording tracks extended on a surface of the substrate so as to lie adjacent to one another, magnetic recording regions formed in each of the recording tracks and having a magnetic recording layer which enables information to be magnetically recorded, and magnetic missing portions which are formed in each of the recording tracks so as to separate the magnetic recording regions from one another, no information being magnetically recorded in the magnetic missing portions;

an acquiring section which acquires position identifying information enabling positions of the magnetic missing portions to be identified;

a recording and reproducing section which records information in a recording layer in the magnetic recording media and which reproduces information from the recording layer; and an authenticating section which extracts the positions of the missing portions from the information reproduced by the recording and reproducing section and which compares the extracted missing positions with the position identifying information to authenticate the magnetic recording media.

Furthermore, according to a further aspect of the present invention, there is provided a method for recording information in a recording layer in magnetic recording media and reproducing the information from the recording layer, the magnetic recording media comprising recording tracks extended on a surface of the substrate so as to lie adjacent to one another, magnetic recording regions formed in each of the recording tracks and having a magnetic recording layer which enables information to be magnetically recorded in the magnetic recording regions, and magnetic missing portions which are formed in each of the recording tracks so as to separate the magnetic recording regions from one another, no information being magnetically recorded in the magnetic missing portions, the method comprising:

acquiring position identifying information that enables positions of the magnetic missing portions to be identified, and extracting the positions of the missing portions from the reproduced information and comparing the extracted missing positions with the position identifying information to authenticate the magnetic recording media.

In the above magnetic recording media, the magnetic recording layer may be extended on the surface of the substrate. Magnetic recording tracks may be defined on the magnetic recording regions. Track separating portions may be formed by arranging the magnetic recording tracks on the substrate in parallel; the track separating portions physically separate the magnetic recording tracks from one another. The magnetic missing portions may be provided in each of the magnetic recording tracks.

Moreover, the magnetic recording track may be divided at fixed intervals across the track. Each dividing portion may comprise a magnetic dividing portion in which information cannot be magnetically recorded. When a recording and reproducing head is used to record information on the media, it records the information in the magnetic recording tracks each divided by the magnetic dividing portions at the fixed periods. That is, each of the periods at which the magnetic recording track is divided corresponds to one information unit recorded by the recording and reproducing head.

In the above magnetic recording media, each of the magnet recording tracks is divided at the fixed periods by the magnetic dividing portions, which are different from the magnetic missing portions in accordance with the present invention. The magnetic dividing portions are arranged at the fixed periods along the magnetic recording tracks. In contrast, the magnetic missing portions are not arranged at any fixed periods but are dispersedly arranged at characteristic positions corresponding to ID information.

BRIEF DESCRIPTION OF THE SEVERAL VIEWS OF THE DRAWING

FIG. 1 is a plan view schematically showing recording regions in magnetic recording media in accordance with an embodiment of the present invention;

FIG. 2 is a plan view schematically showing recording regions in magnetic recording media in accordance with another embodiment of the present invention;

FIG. 5A is a plan view schematically showing the structure of the magnetic recording track shown in FIG. 1;

FIG. 5B is a schematic diagram showing sequence data used as information to be recorded in the magnetic recording track shown in FIG. 5A;

FIG. 5C is a schematic diagram showing how the sequence data shown in FIG. 5B is recorded on the recording media;

FIG. 7A is a plan view schematically showing the structure of the magnetic recording track shown in FIG. 1;

FIG. 7B is a schematic diagram showing sequence data used as information to be recorded in the magnetic recording track shown in FIG. 7A;

FIG. 7C is a schematic diagram showing how the sequence data shown in FIG. 7B is recorded on the recording media;

DETAILED DESCRIPTION OF THE INVENTION

Figure 3:
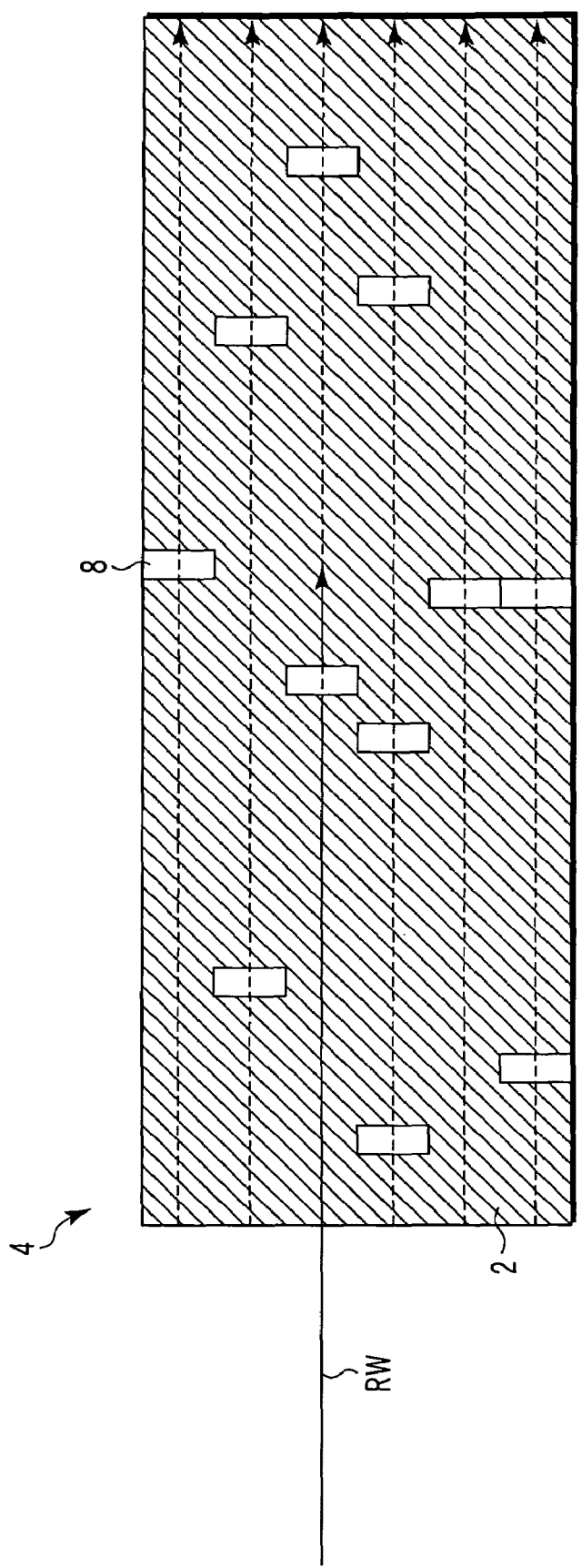
FIG. 3 is a plan view schematically showing recording regions in magnetic recording media in accordance with yet another embodiment of the present invention.

The inventor has focused on discrete track recording media to get the idea that the structure of discrete track media is likely to enable copy protection to be realized while reducing the manufacturing costs of the recording media. Further, on the basis of this idea, the following idea has also been obtained: missing portions are formed in tracks in recording media that is not limited to the discrete track media so that if ID information identifying the sequence of the missing portions genuinely corresponds to the sequence of the missing portions, a content or program recorded in the recording media can be ensured to the original.

With reference to the drawings, description will be given below of recording media, a method for authentication, an authenticating system, a restoring system in accordance with an embodiment of the present invention.

FIG. 1 is a plan view schematically showing recording regions in magnetic recording media in accordance with the embodiment of the present invention.

As shown in FIG. 1, in recording media, for example, a magnetic disk, magnetic recording tracks 2 are arranged adjacent to one another and extended in recording regions along a track direction (recording and reproducing direction) RW. The magnetic recording tracks 2 are physically separated from one another by nonmagnetic separating portions 6 formed of a nonmagnetic substance layer and extended along the magnetic recording tracks 2. A plurality of band-like magnetic layers are formed in each of the magnetic recording tracks as magnetic recording regions. If the recording media shown in FIG. 1 is a disk-like magnetic disk described with reference to FIG. 4, the track direction RW corresponding to the recording and reproducing direction is defined to extend along the circumference of the disk. In normal disk-like disk, its rotating direction is defined to correspond to the recording and reproducing direction. The magnetic recording tracks 2, serving as magnetic layers, are extended along the circumferential direction corresponding to the rotating direction. As already known, an imprint method using a stamper is executed to form patterns of magnetic substance layers and nonmagnetic substance layers, which constitute the magnetic recording tracks 2 and nonmagnetic separating portions 6.

As shown in FIG. 1, in each of the magnetic recording tracks 2 in the recording media, its recording layer is partly missing to form missing portions 8 (missing segments) that separates the recording regions from one another. The missing portions (missing segments) 8 are formed in particular regions 4 in particular magnetic recording tracks 2 in the recording media. The missing portions 8 may be nonmagnetic substance segments similar to the nonmagnetic separating portions 6. Alternatively, the missing portions (segments) 8 may be formed of a magnetic substance and concaves formed in the band of this magnetic substance layer may be defined as the missing portions (segments) 8.

Obviously, the nonmagnetic separating portions 6 may be formed of a magnetic substance similarly to the missing portions (segments) 8, and concaves formed in the band of this magnetic substance layer may be defined as the nonmagnetic separating portions 6.

If a magnetic head (not shown) retrieves any magnetic recording track 2, the missing portions 8, formed as nonmagnetic segments, are not magnetically sensed. Similarly, the missing portions 8 composed of concaves formed in the band of the magnetic substance layer are not substantially magnetically sensed owing to the increased distance between the magnetic portions 8 and the magnetic head.

The present invention is not limited to the case where the missing portions 8 are formed in each magnetic recording track 2 extended like a band as shown in FIG. 1. The recording layer in each magnetic recording track 2 may be divided into pieces along the track direction RW to obtain a structure (patterned media structure) having periodically arranged magnetic dots 12. That is, the magnetic recording tracks 2 may be composed of a large number of magnetic dots 12 arranged periodically along the track direction RW, with some 18 of the periodically appearing magnetic dots 12 missing. In other words, the arrangement of the periodic magnetic dots 12 may be separated into pieces. In a region of the magnetic recording track 2 in which the magnetic dots 12 are periodically arranged, nonmagnetic separating stripes 10 are provided; the nonmagnetic separating stripes 10 are formed of a nonmagnetic substance similarly to the nonmagnetic separating portions 6. The separating stripes 10 and the magnetic dots 12 are alternately arranged on this region of the magnetic recording track 2. Further, each of the missing portions 18 on the magnetic recording track corresponds to the portion in which at least a pair of separating stripes 10 and the magnetic dot 12 located between the pair of separating stripes 10 are otherwise formed. This portion is formed of a nonmagnetic substance layer like the nonmagnetic separating portion 6. The separating stripes 10 and the missing portions 8 are formed of a magnetic substance. However, concaves formed in the band of this magnetic substance layer may be defined as the missing portions 8.

The recording media shown in FIGS. 1 and 2 is formed into a discrete track structure in which the magnetic recording tracks 2 are separated from one another by the separating stripes 10. However, as shown in FIG. 3, the missing parts 8 may be formed in the particular region 4 in a common magnetic recording media in which a magnetic layer is formed all over the surface of the recording media without any separating stripes 10 and in which the magnetic tracks 2 are formed in parallel along the magnetic recording direction RW.

Figure 4:
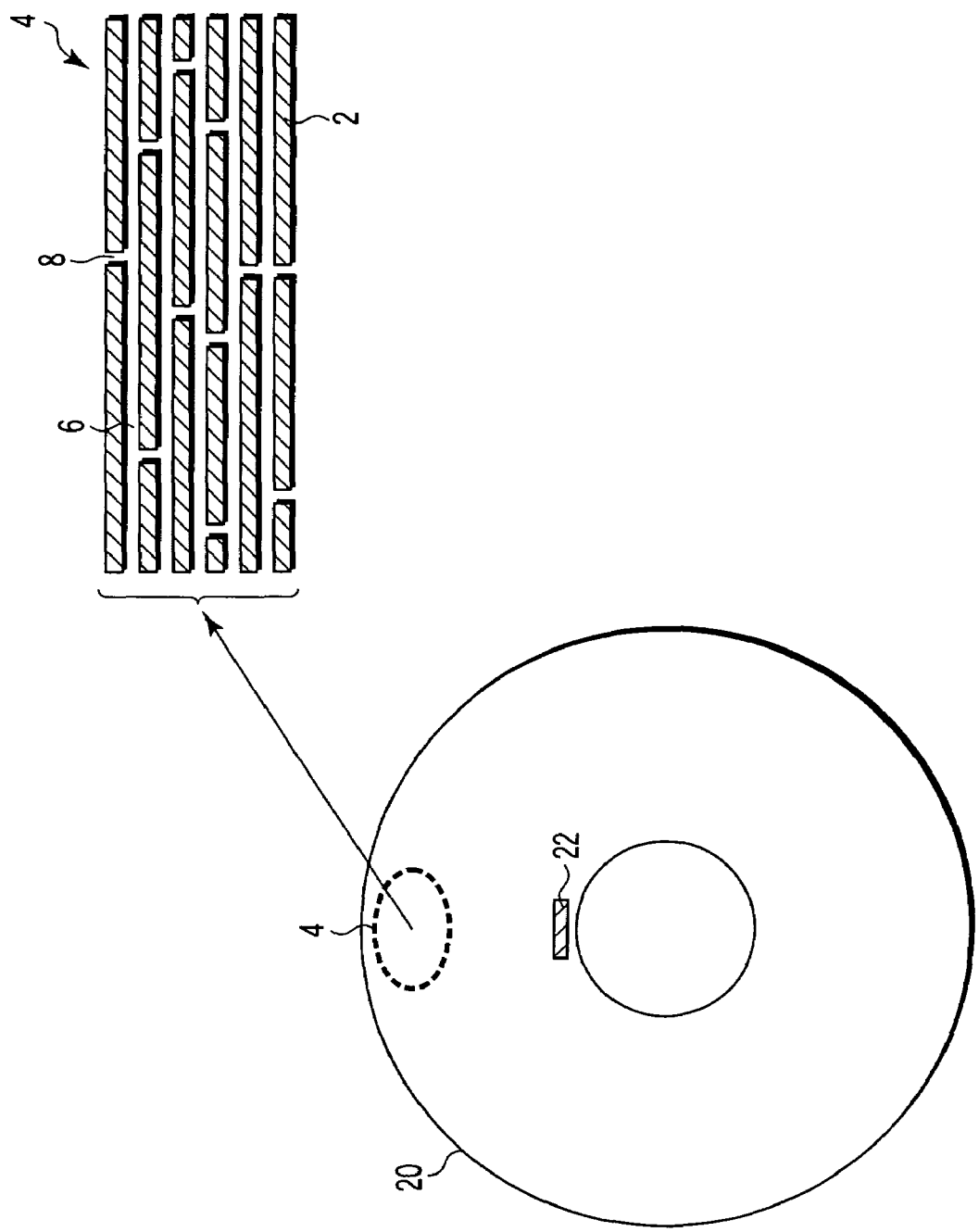
FIG. 4 is a plan view schematically showing a magnetic disk serving as magnetic recording media in which magnetic tracks shown in FIG. 1 are formed.

In a disk-like disk 20 shown in FIG. 4, ID information 22 is recorded in a sector region in a management region in the disk 20; the ID information indicates whether or not the missing portions 8 or 18 are present in the particular region 4. The positions of missing portions in the recording layer, for example, track and sector addresses, are not recorded in the ID information 22. The ID information 22 describes the presence of the missing portions 8 or 18 and a code specific to the arrangement of the missing portions 8 or 18.

A database located outside the recording and reproducing apparatus stores the information enabling the identification of positions of the missing portions 8 or 18 in the recording layer as described later. However, the information may be recorded on the recording media or in a memory integrated into a recording and reproducing apparatus which records and reproduces the information on and from the recording media. The information enabling the identification of positions of the missing portions 8 or 18 in the recording layer is not limited to enumerated positional information on the missing portions in the recording layer such as track and sector addresses. ID information such as address numbers is available which are used to access an external database in which the positional information on the missing portions in the recording layer is recorded, to read the positional information. Alternatively, the ID information 22 and the positional information on the missing portions may be recorded in the magnetic recording region, for example, in the management region, as a sequence (pattern) of the missing portions 8 or 18. That is, the ID information 22 and the positional information on the missing portions may be recorded in the magnetic recording region using a pattern based on the presence or absence of the recording layer or a sequence (pattern) of portions that do not accept magnetic recording.

Now, with reference to FIGS. 5A to 5C and 6, description will be given of a method for authentication used in a recording and reproducing apparatus in accordance with an embodiment of the present invention.

FIGS. 5A to 5C schematically show the structure of the magnetic recording track shown in FIG. 1, sequence data that is information to be recorded in the magnetic recording track, and how the sequence data is recorded on the recording media. It is assumed that in a certain recording region 4, the magnetic track 2 has the missing portion 8 as shown in FIG. 5A and that sequence data consisting of binary data such as "1" and "0" or "+1" and "−1" is recorded in the magnetic track 2 as shown in FIG. 5B. In FIG. 5B, "−1" is shown in white, while "+1" is shown in black, for easy understanding. The magnetic head (not shown) is supplied with the sequence data as magnetic information as shown in FIG. 5B. The information is sequentially recorded in the magnetic recording track 2 shown in FIG. 5A. During information recording, the information is recorded regardless of the missing positions on the recording media. However, no information is recorded in the missing portions 8 on the magnetic track 2. Accordingly, as shown in FIG. 5C, certain information corresponding to white, black, and white as shown by an arrow 28, for example, (−1, +1, −1), is recorded in the missing portion 8 as an actual missing portion. Consequently, sequence data such as that shown in FIG. 5B is recorded on the magnetic track 2 so as to be partly missing.

Figure 6:
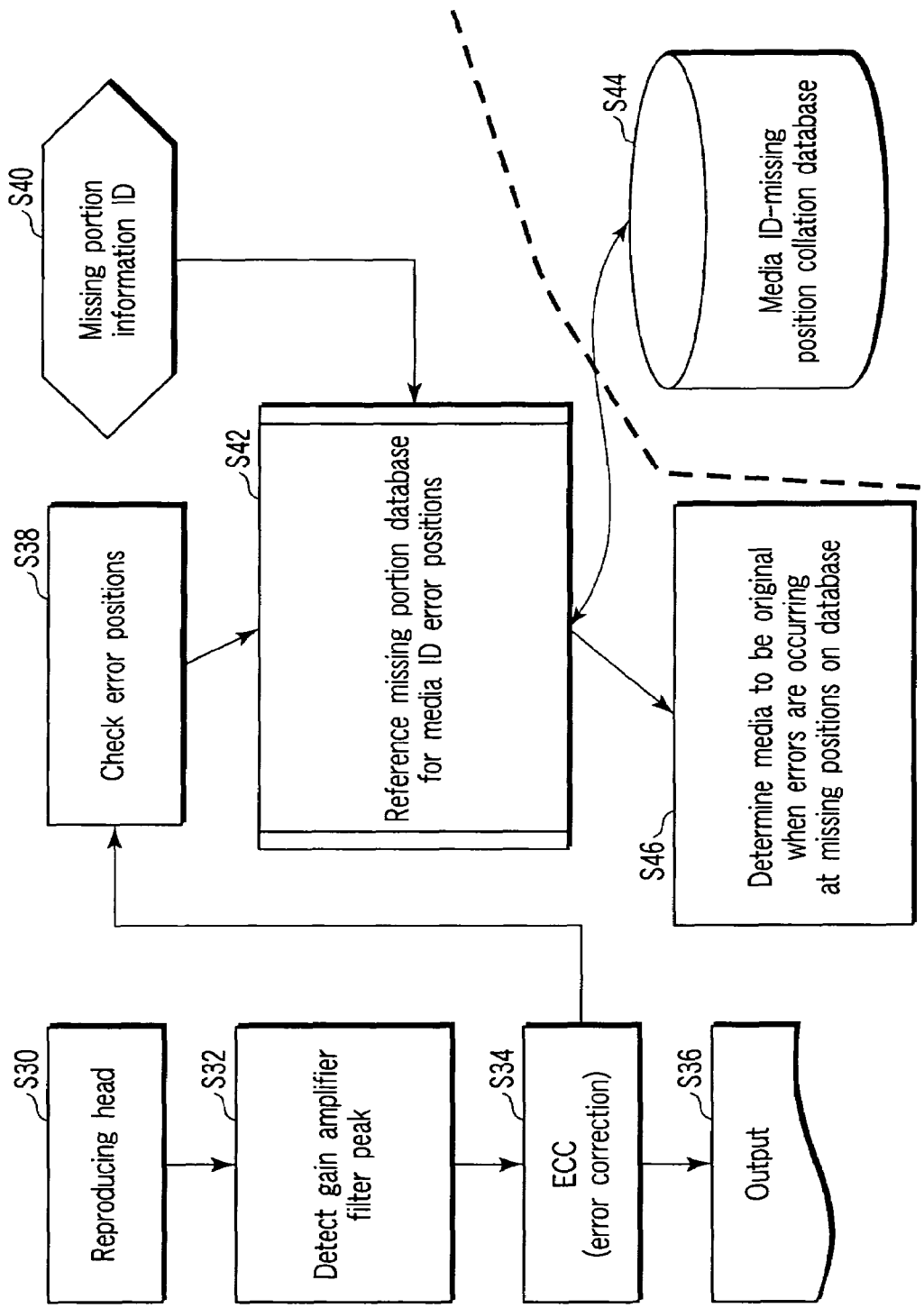
FIG. 6 is a flowchart showing methods for reproducing and authenticating the sequence data recorded as shown in FIG. 5C.

FIG. 6 is a flowchart showing methods for reproducing and authenticating the sequence data recorded as shown in FIG. 5C.

At the beginning of information reproduction, a reproducing magnetic head reads the ID information 22 prerecorded in the management region on the recording media as shown in step S30. The missing information ID 22 read by the reproducing magnetic head is temporarily stored in RAM (not shown) as management data as shown in step S40. All the management information is read and the reproducing magnetic head then retrieves the data region. The reproducing magnetic head thus reads object data such as a program, audio data, or video data.

When information including such management information and object data is reproduced, a detection signal from the reproducing magnetic head in step S30 is subjected to processes executed by a gain amplifier and a filter (not shown) and a peak detecting process as shown in step S32. Then, as shown in step S34, errors are corrected to covert the data into restored data, which is then output as shown in step S36.

In this case, the error correction is carried out by an ECC (Error Correction Code) circuit. The error correction may be achieved by, for example, using encoding for information recording. The encoding involves a Reed Solomon code, a convolutional code, a concatenated code, Viterbi decoding, a turbo code, an LDPC (Low Density Parity Check) code, or the like. In general, any of these codes may be used to add redundant data to a data block of k bits to obtain an error correction code of n bits (n>k). The error correction code can correct an error of m bits for the data block of k bits. That is, in the data block of k bits, even if at most m bits are erroneously read, the error correction enables the original data to be correctly restored. The value for an error correction capability m for k bits and code length n varies depending on the encoding system. The missing portions in accordance with the above embodiment are effective unless the amount of missing data exceeds the value for the error correcting capability m. Consequently, the present invention does not limit a specific technique for encoding. For example, the Reed-Solomon code uses a j×2-byte ECC to provide a j-byte correcting capability. Naturally, preferably, the correcting capability of the Reed-Solomon code is not exceeded by the number of missing data (binary data) that can be stored in the missing portions 8 in each track. Provided that the number of errors does not exceed the correcting capability, recorded information can be restored even if the information otherwise present in the missing portions 8 is missing. In this sense, the missing portions 8 must be arranged in the magnetic recording track 2 so that the number of data missing from the missing portions falls within the range of the error correcting capability.

The data restored by the error correction is supplied to a reproduction processing section or another data processing section. The data is also transferred to an error position checking process as shown in step S38. In step S38, the restored data is compared with detection signals obtained before the error correction to identify the positions of errors corresponding to the restored data positions. That is, the error positions are identified by comparing the restored data with the data prior to the restoration. The identified errors include data otherwise recorded in the missing portions 8 and defects on the disk or recorded or reproduced data accidentally generated during data processing. The errors corresponding to the missing portions 8 are ensured to be extracted in step S38. In this step, it is possible to exclude errors other than those resulting from the missing portions 8, for example, those exceeding a particular bit length.

The extracted errors are converted into data on error positions to identify the error positions. That is, the extracted error positions are stored in RAM (not shown) as positions on the disk where errors have occurred. The positions on the disk where errors have occurred are identified as track and sector addresses on the disk.

If the recorded information is an image or music, the reproduced information can be viewed to some degree without completely restoring the information by the error correction. In this case, instead of the error correction, an error discovering mechanism such as parity check may determine the information error positions to be the positions of the missing portions 8 or 18 in the recording layer.

Then, in step S42, the missing information IDs stored in RAM in step S40 are referenced to check whether or not the disk has the missing portions 8. Then, on the basis of the IDs, the apparatus confirms that the disk has the missing portions 8. Further, in step S42, the missing information IDs are sent to a missing position collation database. In step S44, the apparatus references the missing information IDs to identify missing position collation information. Once the recording and reproducing apparatus acquires the missing position collation information, it references the information to check whether or not the information contains the extracted error position data. As shown in step S46, if the missing position collation information contains all or almost all of the extracted error position data, the contents data such as a program or video which is recorded in the disk is genuine and original. Once the recorded data is confirmed to be original and is accepted, a decoder (not shown) decodes an output obtained in step S36. Alternatively, the original data may be restored by another processing section (not shown), a decoding section that executes a deciphering process.

In this case, the external missing position collation database corresponds to a database of a contents provided connected to the Internet. The recording and reproducing apparatus corresponds to an apparatus utilized by a user having contracted with the contents provider to have contents supplied to the user. The user, the contractor, informs the contents provider of the positional information on the missing portions 8 to receive missing information IDs from the contents provider.

On the other hand, if the information recorded in the original media has been copied to another media, only the magnetized information is copied. Consequently, no actual missing portions are present in the copied media. Therefore, if the read error positions are compared using the above technique, the read errors do not occur in the copied media. No errors occur in the missing portions recorded in the recording region. In this case, the recorded information is not determined to the original. Thus, for example, copy protection can be carried by, for example, invalidating the recorded information. The copy protection can made more reliable by using an information enciphering technique.

The above description assumes that the missing position collation information referenced using the missing position IDs is stored in the database located outside the recording and reproducing apparatus. However, the missing position collation information may be stored in a memory provided in the recording and reproducing apparatus, for example, ROM or a nonvolatile memory, and may be referenced using the missing information IDs.

If the recording and reproducing apparatus contains a recording region for the missing position collation information, authentication can be achieved even if the recording apparatus is not connected to any external peripheral equipment. On the other hand, if a recording region in which the missing position collation information is recorded is present outside the user's apparatus, for example, on a network, a certain user authenticating mechanism may be provided in the recording region to prevent a general user using the recording and reproducing apparatus from changing the missing positions without permission. This makes copy management more reliable.

Embodiment 1

Now, description will be given of a copy protection method using an enciphering technique, as an embodiment of the present invention.

A detailed description will be given of a copy protection method used in copying and recording certain information from a server in the above recording apparatus.

With this copy protection method, the missing portion 8 of size n bits is artificially provided in each sector of the recording layer in magnetic recording media provided in the recording apparatus. Further, for recording on the magnetic recording media, ECC is provided which has an error correcting capability for m bytes where m is larger than n. The missing portion artificially formed in each sector is recorded in the server and stored together with the ID of that recording media.

To record information such as contents data which is stored in the server, in a particular user's recording apparatus (simply referred to as a particular recording apparatus below), the server enciphers the information and creates a deciphering key. Then, the server receives the ID of copied media and sends the enciphered information to the particular recording apparatus. The particular recording apparatus records the enciphered information on its recording media together with ECC.

Then, the enciphered data is copied from the particular recording apparatus to an unauthorized recording apparatus (simply referred to as a second recording apparatus) as it is. On this occasion, the media ID of the particular recording apparatus is also read and copied to the second recording apparatus. However, the missing positions in the media differ between the particular recording apparatus and the second recording apparatus.

To reproduce the information recorded in the particular recording apparatus, the particular recording apparatus first restores the information via an ECC circuit. Since the number n of missing portions artificially formed does not exceed the error correcting capability m, the information recorded in the sectors with the missing portions is output after being subjected to error correction. Then, to restore the output enciphered information, the particular recording apparatus transmits the regions subjected to error correction by the ECC circuit as well as the media ID to the server. The server then checks the transmitted error regions and media ID against missing portion information stored in the server. If the transmitted error regions include all the missing regions stored in the server, the server determines the particular recording apparatus to be regular and then transmits a private key. Accordingly, the particular recording apparatus can receive and use the private key (deciphering key) to restore the enciphered information.

On the other hand, with an authenticating technique similar to the one described above, the positions subjected to error correction, that is, the positions of the missing portions artificially formed, differ between the particular recording apparatus and the second recording apparatus, to which the information and the media ID has been copied. Consequently, the missing positions prestored in the server are different from the error positions sent by the second recording apparatus. As a result, the second recording apparatus is not determined to be regular and the private key is not transmitted. Therefore, the second recording apparatus, to which information from the particular recording apparatus is copied, cannot restore the enciphered information. The above operation enables the copy protection function to be reliably operated.

Embodiment 2

FIGS. 7A to 7C show a method for recording and reproduction and a method for authentication in accordance with another embodiment of the present invention. FIG. 7A shows the structure of the magnetic recording track shown in FIG. 1. FIG. 7B shows sequence data used as information to be recorded in the magnetic recording track. FIG. 7C schematically shows how the sequence data shown in FIG. 7B is recorded on the recording media.

To record information, the position of a missing portion 8 such as the one shown in FIG. 7A is first determined on the basis of the media missing position ID and the missing position recording region 4, as already described. Then, sequence data such as that shown in FIG. 7B is recorded on the magnetic recording track except for the position of the missing portion 8 as shown in FIG. 7C. Consequently, the sequence data, separated into pieces, is recorded on the magnetic recording track 2 except for the missing portion 8. To reproduce the information, the position of a missing portion 8 such as the one shown in FIG. 7A is similarly determined on the basis of the media missing position ID and the missing position recording region 4. Then, the sequence data is reproduced from the magnetic recording track except for the position of the missing portion 8 as shown in FIG. 7C. Therefore, the sequence data is reproduced normally. For information recording, the following are recorded in the management region in the recording media: the recorded information and the ID of the media on which the information has been recorded.

However, if the information is copied to recording media in another recording apparatus having missing positions, the missing positions encountered when the recorded information is reproduced differ from those identified by the prerecorded ID of the recording media. Therefore, the recorded information is not determined to be the original. This enables copy protection to be realized by, for example, invalidating the recorded information.

(Method for Producing Media)

The recording media shown in FIG. 1 can be produced using a first or second method for manufacturing described below.

First Method for Manufacturing (Processing of a Magnetic Substance)

First, missing positions formed in recording media and ID information on the missing positions are created and stored in the recording apparatus as missing portion information.

Then, an imprint stamper is produced as shown in FIGS. 8A to 8D.

Figure 8A:
FIGS. 8A to 8G are sectional views schematically showing a process used for a method for manufacturing the recording media shown in FIG. 1.
Figure 8B:
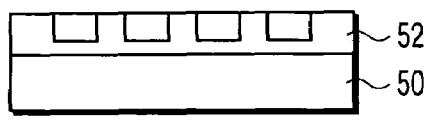

In the process of producing an imprint stamper, as shown in FIG. 8A, an imprint stamper substrate 50 having a flat surface, preferably, an Si or glass substrate is provided. A resist 52 for electron beam drawings is applied to the flat surface of the substrate 50. Such patterns as shown in FIG. 1 which correspond to the magnetic recording tracks 2 are drawn on the resist 52 using an electron beam. The resist 52 is then developed to form patterns on the substrate 50 as concaves and convexes on the resist 52 as shown in FIG. 8B. A drawing apparatus that draws the pattern draws the patterns of the magnetic recording tracks 2 all along the resist. The drawing apparatus also writes a code corresponding to ID information in a management region on the recording media in accordance with the ID information. The drawing apparatus thus draws the missing portions 8 in the particular region 4 on the recording media in accordance with the missing positions. As a result, the following are formed on the developed resist 52: grooves corresponding to the magnetic recording tracks 2, concaves and convexes corresponding the ID information, and convexes corresponding to the missing portions 8; the concaves and convexes are formed in the grooves corresponding to the magnetic recording tracks 2.

Figure 8C:
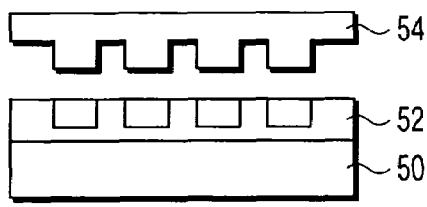

Subsequently, as shown in FIG. 8C, a stamper is electroformed on the resist 52. A material for the stamper 54 is preferably Ni but is not limited to it. The concaves and convexes on the resist 52 are reversely transferred to the surface of the stamper 54. Further, although not shown in the drawings, a stamper may be formed by etching the resist 52 shown in FIG. 8B and transferring the concaves and convexes on the resist 52 to the substrate 50 as they are.

The above process is executed to provide the imprint stamper 54. Then, the imprint stamper 54 is utilized to manufacture magnetic recording media through the steps shown in FIGS. 8D to 8G.

Figure 8D:
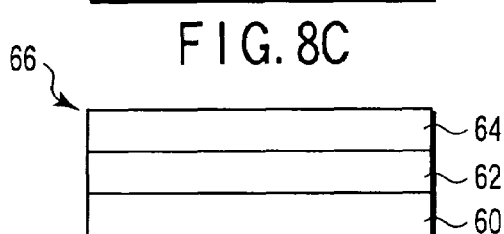

In the process of manufacturing magnetic recording media, as shown in FIG. 8D, a media substrate 60 is provided, on which a magnetic layer 62 for magnetic recording is deposited. A material for the magnetic layer 62 is preferably suitable for perpendicular magnetic recording. The magnetic layer 62 is formed of a recording ferromagnetic film. Preferably, an underlayer consisting of a soft magnetic material is formed under the recording ferromagnetic film. The magnetic layer 62 thus has a two-layer structure including the soft magnetic underlayer and the ferromagnetic film. As shown in FIG. 8D, an imprinting resist film 64 is further applied to the magnetic layer 62. A substrate structure 66 is thus provided which comprises the resist film 64.

Figure 8E:
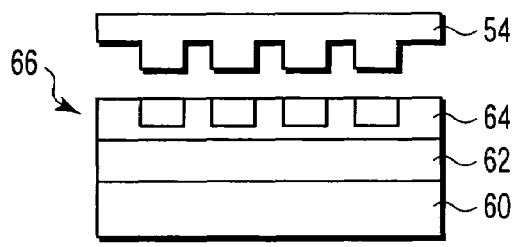
Figure 9E:
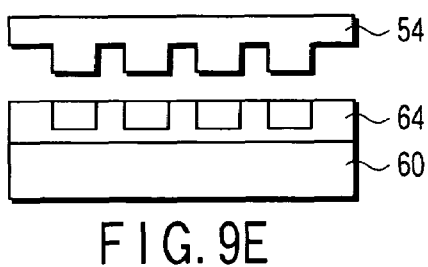

Then, the imprint stamper is located opposite the substrate structure 66 comprising the resist film 64 as shown in FIG. 8D. On the basis of an imprinting method, the imprint stamper is pressed against the resist film 64 to exert pressure between the imprint stamper 54 and the substrate structure 66. Consequently, the concave and convex patterns on the surface of the imprint stamper 54 are transferred to a surface of the resist film 64. After the transfer, the imprint stamper 54 is stripped from the substrate structure 66 shown in FIG. 8D, as shown in FIG. 8E.

Figure 8F:
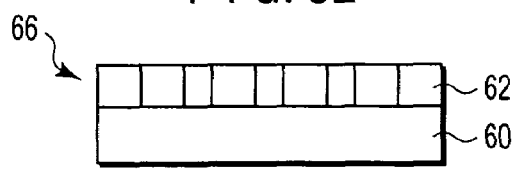

Moreover, as shown in FIG. 8F, the resist film 64 is etched on which the concave and convex patterns have been formed. The substrate structure 66 is thus processed so that similar concave and convex patterns are formed on the magnetic layer 62. That is, as shown in FIG. 8F, the magnetic layer 62 is patterned in accordance with the concave and convex patterns on the surface of the resist layer.

Figure 8G:
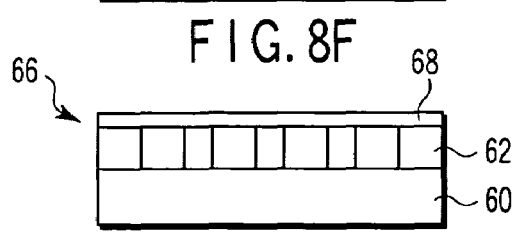

Subsequently, as shown in FIG. 8G, a carbon protect film 68 is provided on the substrate structure 66 having the magnetic substance patterns formed on the magnetic layer 62. Moreover, a lubricant is applied to the carbon protect film 68 to complete magnetic recording media. In this case, the lubricant allows the magnetic head to travel smoothly on and relative to the rotating magnetic recording media.

The method described with reference to FIGS. 8A to 8G produces recording media on which patterns of magnetic substance tracks and a nonmagnetic substance are formed, the magnetic substance tracks comprising missing portions in the recording layer, as shown in FIG. 1 or 2. The recording media is integrated into the recording apparatus using a method similar to that of the conventional technique.

Second Method for Manufacturing (Processing of a Substrate)

Figure 9A:
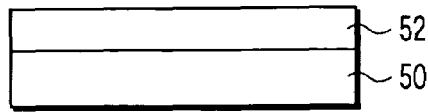
FIGS. 9A to 9G are sectional views schematically showing a process used for another method for manufacturing the recording media shown in FIG. 1.
Figure 9B:
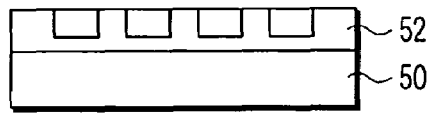
Figure 9C:
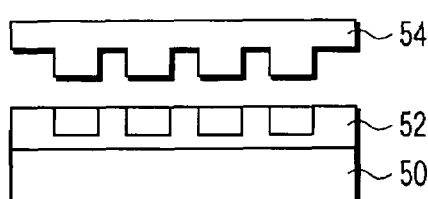

With a second method for manufacturing, as shown in FIGS. 9A to 9C, an imprint stamper is produced through the steps shown in FIGS. 8A to 8C as in the case of the first method for manufacturing. Accordingly, the description of the steps shown in FIGS. 9A to 9C uses the same reference numerals as those in the steps shown in FIGS. 8A to 8C. The corresponding description is thus omitted.

Figure 9D:
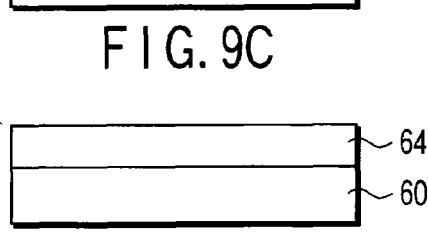

Then, as shown in FIG. 9D, the media substrate 60 is provided and the imprinting resist 64 is applied to the media substrate 60 to provide a media substrate structure 70. The media substrate structure 70 is located opposite the imprint stamper 54 as shown in FIG. 8E. Then, on the basis of an imprinting method, the imprint stamper 54 is pressed against the resist film 64 to exert pressure between the imprint stamper 54 and the substrate structure 66. Consequently, the concave and convex patterns on the surface of the imprint stamper 54 are transferred to the surface of the resist film 64. After the transfer, the imprint stamper 54 is stripped from the resist film 64.

Figure 9F:
Figure 9G:
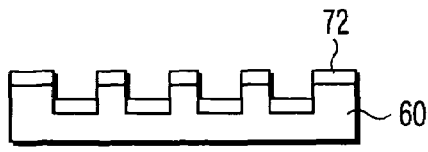

Moreover, as shown in FIG. 9F, the resist film 64 is etched on which the concave and convex patterns have been formed. This forms similar concave and convex patterns on the substrate 60 of the substrate structure 66. Subsequently, as shown in FIG. 9G, a magnetic layer 72 for magnetic recording is deposited on the substrate 60 on which the concave and convex patterns have been formed. A material for the magnetic layer 72 is preferably suitable for perpendicular magnetic recording. The magnetic layer 72 is formed of a recording ferromagnetic film. Preferably, an underlayer consisting of a soft magnetic material is formed under the recording ferromagnetic film. The magnetic layer 72 thus has a two-layer structure including the soft magnetic underlayer and the ferromagnetic film. Finally, a carbon protect film is provided on the magnetic layer 72 on the substrate 60 having the concave and convex patterns. Moreover, a lubricant is applied to the carbon protect film to complete recording media.

The above method for manufacturing enables the production of recoding media having missing portions in a recording layer as magnetic substance concave patterns on the surface of the recording layer. Data can be recorded on this recording media in a manner similar to that used in the prior art.

According to the present invention, if a general user copies information recorded in the recording apparatus, it is possible to determine whether the recorded information is the original or a copy using the missing portion information. This enables authentication or copy protection.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording and reproducing apparatus comprising:
   a magnetic recording medium comprising recording tracks extended on a surface of the substrate so as to lie adjacent to one another, magnetic recording regions formed in each of the recording tracks and having a magnetic recording layer which enables information to be magnetically recorded, and magnetic missing portions which are formed in each of the recording tracks so as to separate the magnetic recording regions from one another, no information being magnetically recorded in the magnetic missing portions;
   an acquiring section which acquires position identifying information enabling positions of the magnetic missing portions to be identified;
   a recording and reproducing section which records information in a recording layer in the magnetic recording medium and which reproduces information from the recording layer; and an authenticating section which extracts the positions of the missing portions from the information reproduced by the recording and reproducing section and which compares the extracted missing positions with the position identifying information to authenticate the magnetic recording medium.

2. The recording and reproducing apparatus according claim 1, wherein magnetic recording medium further comprises track separating portions which physically separate the recording tracks arranged adjacent to one another.

3. The recording and reproducing apparatus according claim 1, wherein positional information that enables positions of the missing portions to be identified is recorded in each magnetic recording track as magnetically non-erasable patterns.

4. A method for recording information in a recording layer in a magnetic recording medium and reproducing the information from the recording layer, the magnetic recording media comprising recording tracks extended on a surface of the substrate so as to lie adjacent to one another, magnetic recording regions formed in each of the recording tracks and having a magnetic recording layer which enables information to be magnetically recorded, and magnetic missing portions which are formed in each of the recording tracks so as to separate the magnetic recording regions from one another, no information being magnetically recorded in the magnetic missing portions, the method comprising:

acquiring position identifying information that enables positions of the magnetic missing portions to be identified, and extracting the positions of the missing portions from the reproduced information and comparing the extracted missing positions with the position identifying information to authenticate the magnetic recording medium.

5. The method for recording and reproduction according to claim 4, wherein the magnetic recording medium further comprises track separating portions which physically separate the recording tracks arranged adjacent to one another.

6. The method for recording and reproduction according to claim 4, wherein the magnetic recording regions are formed in the adjacent magnetic recording tracks, and track separating portions are formed on the substrate to physically separate the adjacent magnetic recording tracks from one another.

7. A method for authentication comprising:

reading identification (ID) information from a magnetic recording medium comprising recording tracks extended on a surface of the substrate so as to lie adjacent to one another, magnetic recording regions formed in each of the recording tracks and having a magnetic recording layer which enables information to be magnetically recorded, and magnetic missing portions which are formed in each of the recording tracks so as to separate the magnetic recording regions from one another, no information being magnetically recorded in the magnetic missing portions, the ID information identifying a sequence of the magnetic missing portions, and then searching the magnetic recording medium to identify the positions of the magnetic missing portions to generate magnetic missing position information; and outputting the ID information and the magnetic missing position information to have the magnetic recording medium authenticated.

8. The method for authentication according to claim 7, wherein the magnetic recording medium further comprises track separating portions which physically separate the recording tracks arranged adjacent to one another.

9. The method for authentication according to claim 7, wherein the ID information which identifies the magnetic missing position information is externally acquired by outputting the magnetic missing portion position information to an exterior.

10. The method for authentication according to claim 7, wherein enciphered contents are recorded on the magnetic recording medium, and a restoring key which restores the enciphered contents is externally received as an authentication indicating that the ID information identifies the magnetic missing position information.

11. A magnetic recording medium comprising:
a substrate;
recording tracks extended on a surface of the substrate so as to lie adjacent to one another;
magnetic recording regions formed in each of the recording tracks and having a magnetic recording layer which enables information to be magnetically recorded; and
magnetic missing portions which are formed in each of the recording tracks so as to separate the magnetic recording regions from one another, no information being magnetically recorded in the magnetic missing portions, wherein positional information that enables positions of the missing portions to be identified is recorded in each magnetic recording track as magnetically non-erasable patterns.

12. The magnetic recording medium according to claim 11, further comprising track separating portions which physically separate the recording tracks arranged adjacent to one another.

13. A magnetic recording medium comprising:
a substrate;
recording tracks extended on a surface of the substrate so as to lie adjacent to one another;
magnetic recording dots periodically formed in each of the recording tracks and made of a magnetic recording layer which enables information to be magnetically recorded in the magnetic recording layer; and
magnetic missing portions which are formed in each of the recording tracks so as to separate the periodic sequence of the magnetic recording dots into pieces, no information being magnetically recorded in the magnetic missing portions, wherein positional information that enables positions of the missing portions to be identified is recorded in each magnetic recording track as magnetically non-erasable patterns.

14. The magnetic recording medium according to claim 13, further comprising track separating portions which physically separate the recording tracks arranged adjacent to one another.

* * * * *